Figure 1:
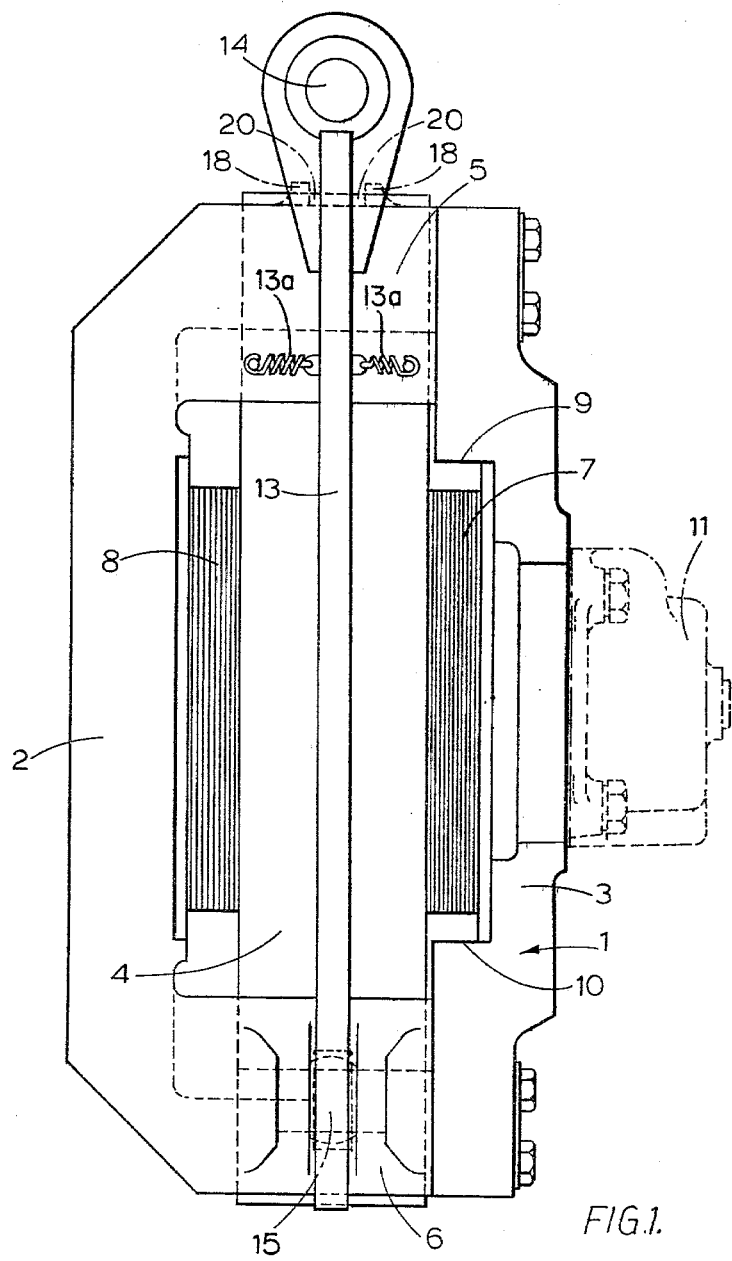

United States Patent [19]

Harrison et al.

[11] 4,301,895
[45] Nov. 24, 1981

[54] DISC BRAKES FOR RAILWAY VEHICLES

[75] Inventors: Anthony W. Harrison, Birmingham; John P. Bayliss, Redditch, both of England

[73] Assignee: Girling Limited, Birmingham, England

[21] Appl. No.: 25,863

[22] Filed: Apr. 2, 1979

[30] Foreign Application Priority Data

Apr. 8, 1978 [GB] United Kingdom ............... 13860/78

[51] Int. Cl.$^3$ .................. B61H 5/00; F16D 65/02
[52] U.S. Cl. ................................. 188/59; 188/71.1; 188/73.1; 188/205 R; 188/234; 188/73.41; 188/73.46; 188/73.47; 188/93
[58] Field of Search ............ 188/71.1, 73.3, 59, 188/205 R, 206 R, 206 A, 72.5, 73.4

[56] References Cited

U.S. PATENT DOCUMENTS

| 2,150,631 | 3/1939 | Piron | 188/206 R |
| 2,214,762 | 9/1940 | Eksergian | 188/59 |
| 2,873,005 | 2/1959 | Butler | 188/73.4 |
| 3,166,159 | 1/1965 | Burnett | 188/73.3 |
| 3,433,328 | 3/1969 | Swift | 188/73.3 X |
| 3,604,538 | 9/1971 | Thompkin | 188/59 |
| 4,134,477 | 1/1979 | Asquith | 188/73.3 |
| 4,144,952 | 3/1979 | Nakayama | 188/73.3 |

FOREIGN PATENT DOCUMENTS 2227390  1/1974  Fed. Rep. of Germany ..... 188/73.3

Primary Examiner—George E. A. Halvosa
Attorney, Agent, or Firm—Scrivener, Clarke, Scrivener and Johnson

[57] ABSTRACT

A disc brake comprises a rigid caliper which straddles the peripheral edge of a rotatable disc, and friction pads for engagement with the disc are located in the caliper. One pad is applied directly to the disc by an actuator which is provided in adjacent limb of the caliper, and the other pad is applied to the disc by the reaction on the caliper which causes the caliper to move with respect to the disc and a relatively stationary drag-taking part from which the caliper is carried by a drag-transmitting arm. The arm is connected at one end to the stationary part by a single pivot pin which pivots the arm for movement about an axis normal to the axis of the disc, and the arm is coupled to the caliper by of a spherical joint.

13 Claims, 12 Drawing Figures

4,301,895

DISC BRAKES FOR RAILWAY VEHICLES

SPECIFIC DESCRIPTION

This invention relates to disc brakes for railway vehicles of the kind in which a rigid caliper straddles the peripheral edge of a rotatable disc and friction pads for engagement with opposite faces of the disc are located in the caliper, one of the pads being applied directly to an adjacent face of the disc by actuating means associated with an adjacent limb of the caliper, and the other pad being applied to the opposite face of the disc by the reaction on the caliper which causes the caliper to move with respect to the disc and a relatively stationary drag-taking member from which it is carried.

In disc brakes of the kind set forth difficulty is experienced in compensating for the relative movement between the stationary member, the disc, and the pads which occurs as the vehicle is travelling over the rails.

According to our invention in a disc brake of the kind set forth a drag-transmitting arm is connected at one end to the drag-taking member by a pivotal connection which pivots the arm for movement about an axis normal to the axis of the disc, and the arm is also coupled to the caliper by means of a spherical joint.

The provision of the arm allows the caliper to move relative to the disc about the pivotal connection and the spherical joint in response to the reaction of the actuating means and for the caliper, as dictated by the pads, to adjust its position automatically with respect to the disc to compensate for irregularities in the braking faces of the disc, and relative movement between the disc and the stationary member as the vehicle is travelling over the rails. For example, the arm permits the caliper to articulate as required to compensate for angular movement of the disc caused by differential vertical movement of the wheels and differential and/or uneven wear of the friction pads.

A restraint connection is also provided between the arm and the caliper to restrain movement of the caliper with respect to the arm and to restore the caliper to a neutral position following bodily movement in response to, for example, angular movement of the disc as described above.

Conveniently the arm extends from the pivotal connection over the caliper itself in a circumferential direction with the spherical joint providing a connection between its opposite free end and the end of the caliper which is remote from the stationary member, and the restraint connection is provided between the arm and an intermediate point in its length and the end of the caliper which is adjacent to the stationary member.

In one construction the restraint connection comprises a pair of lugs which project from the end of the caliper to straddle the end of a slot in the arm and into which that end of the caliper extends with clearances provided between the lugs and the arm and between the caliper and the radially innermost and outermost sides of the slot with springs acting between the arm and the caliper to restrain relative tilting movement therebetween.

In another construction the restraint connection comprises a spindle which projects at opposite ends from a bushing retained within a spring ring in the caliper and opposite ends of the spindle are received in a bifurcated portion of the arm, the bushing being of low friction material to restrain movement along the axis of the spindle, and the spring ring acting to restrain relative tilting movement between the caliper and the arm.

Figure 2:
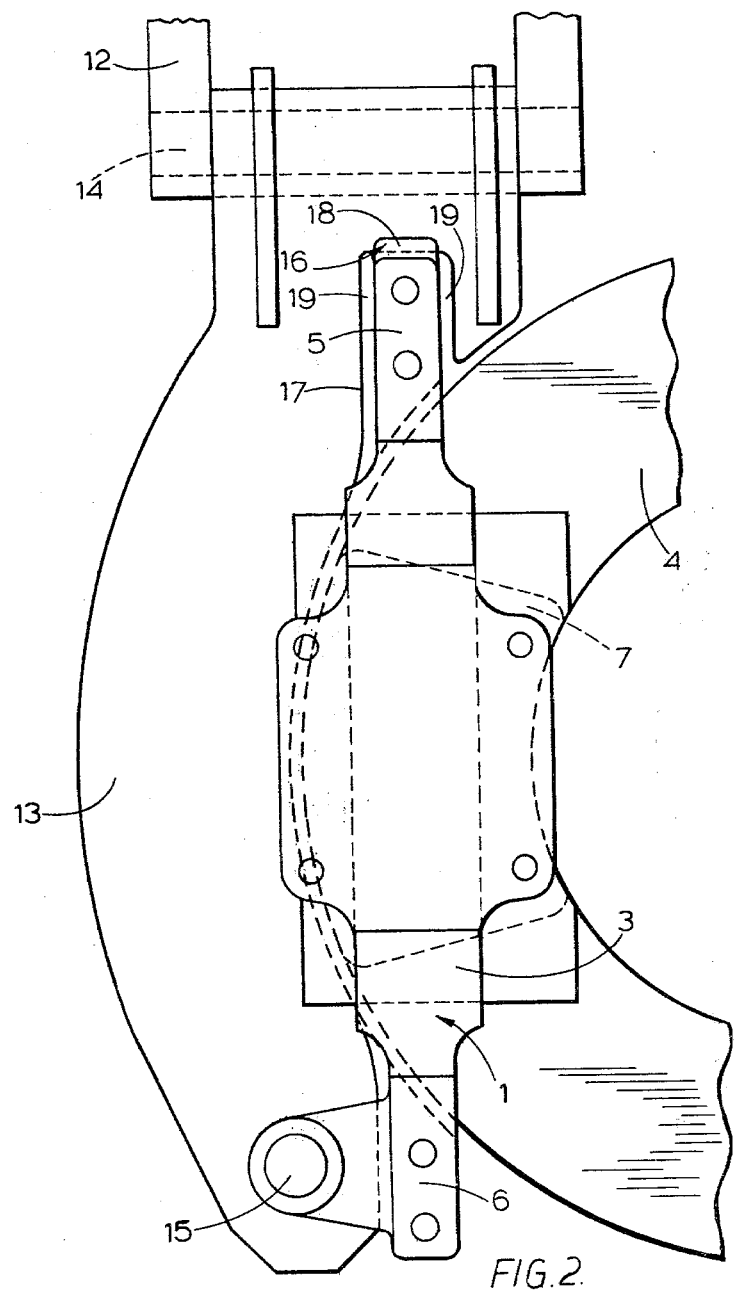
Figure 3:
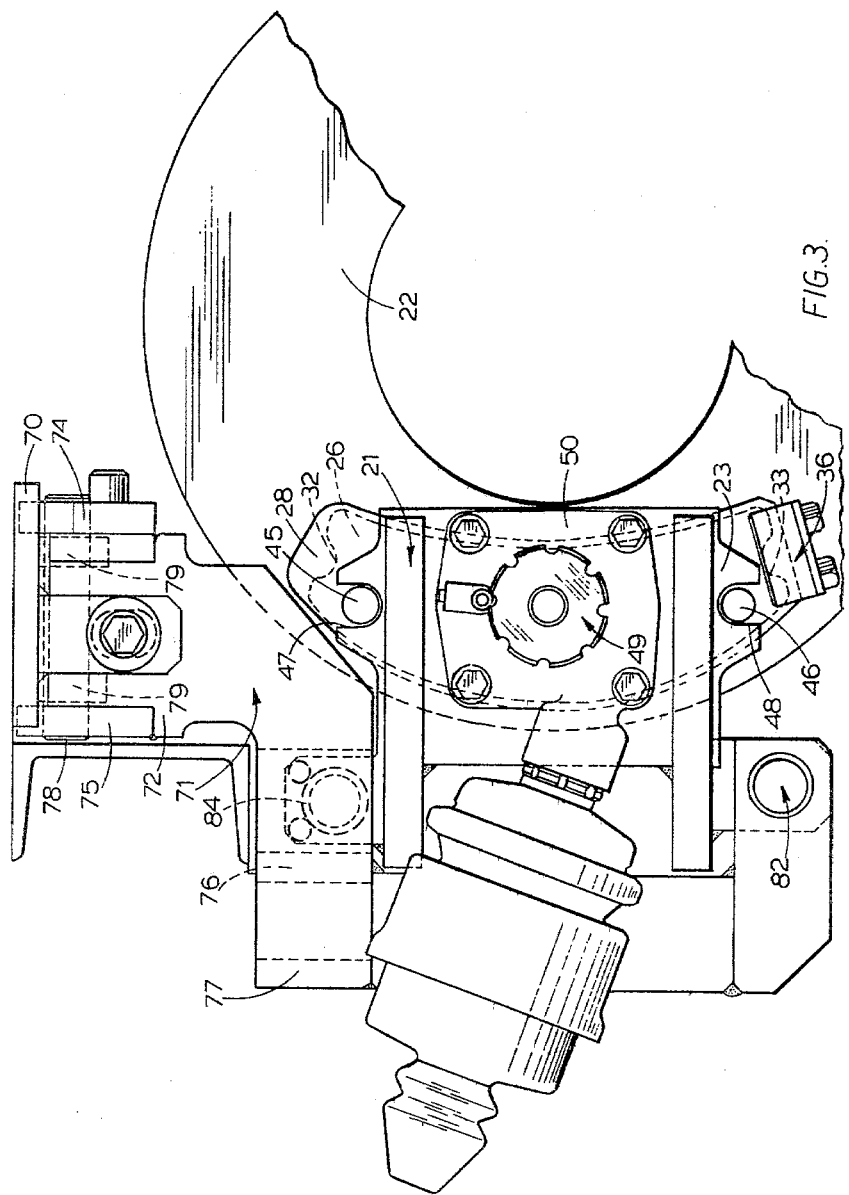
Figure 4:
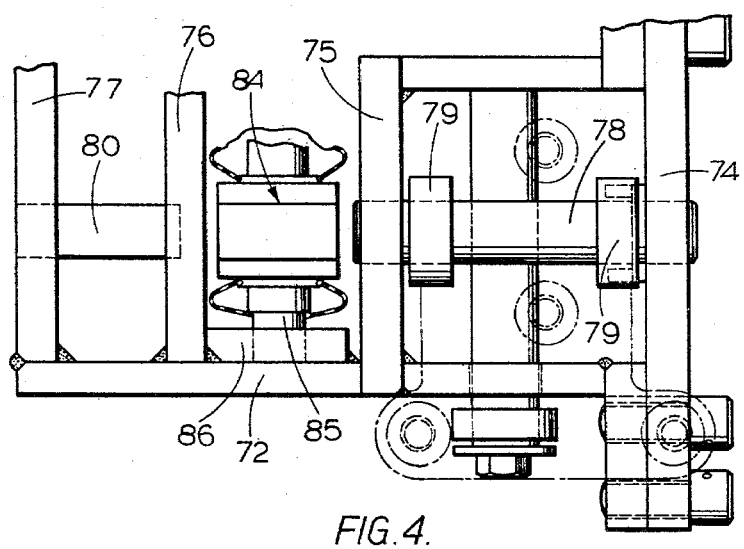
Figure 5:
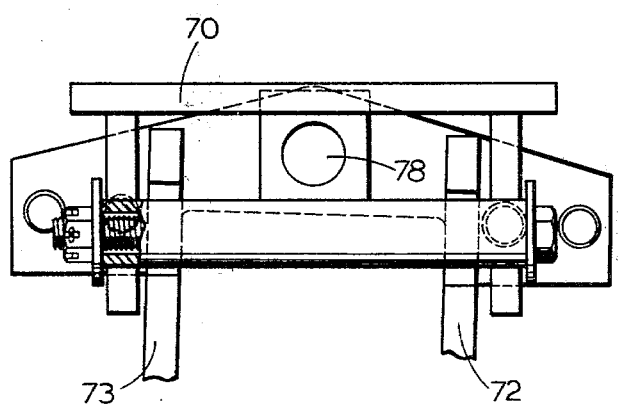
Figure 6:
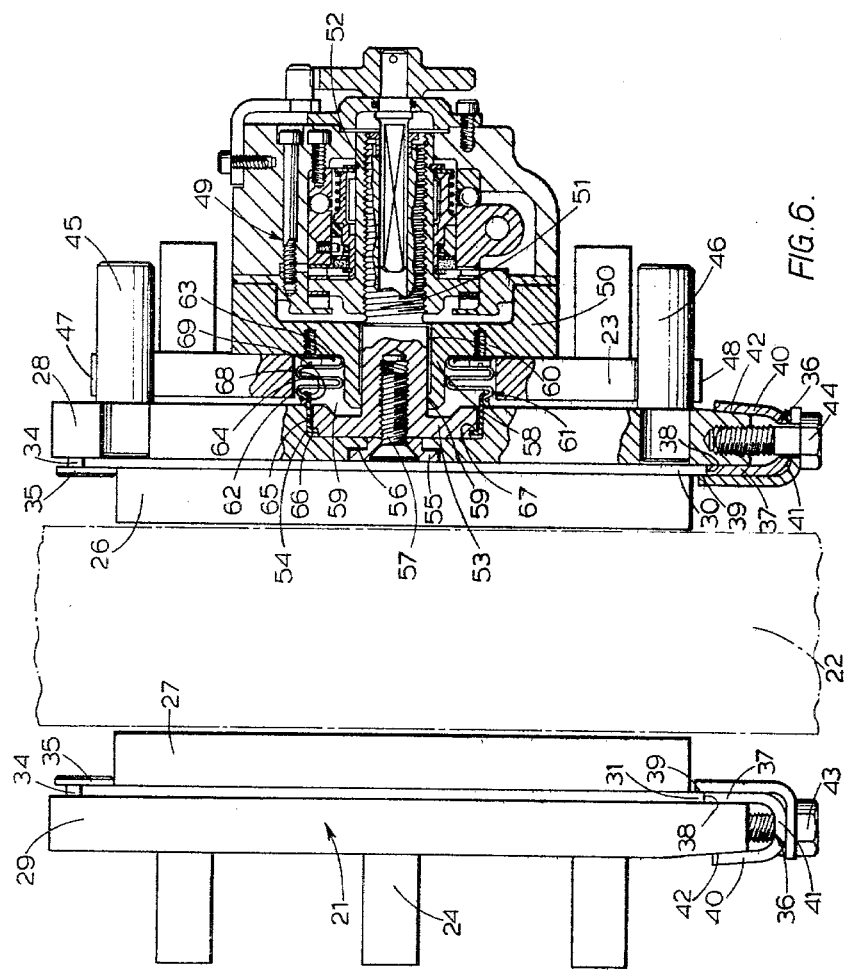
Figure 7:
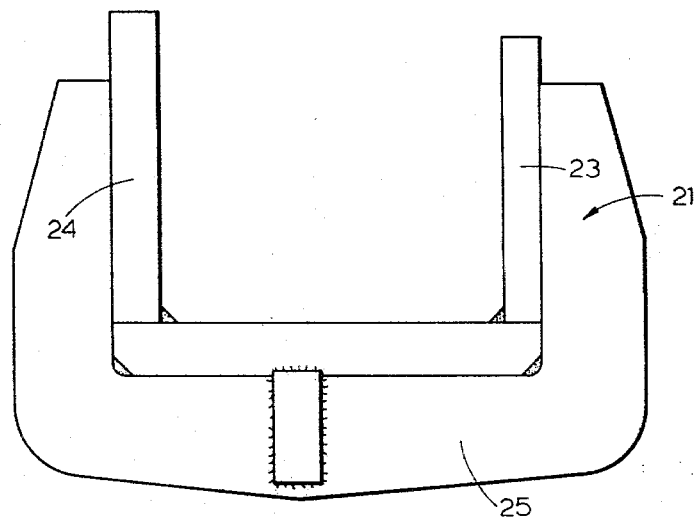
Figure 10:
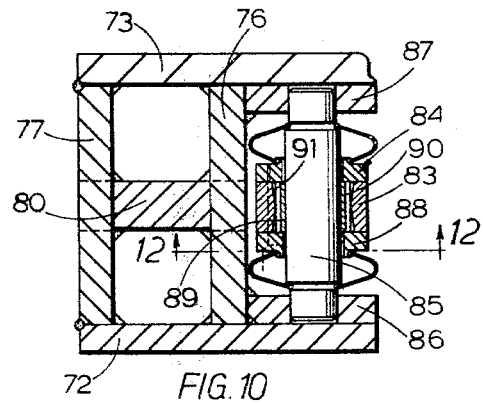
Figure 11:
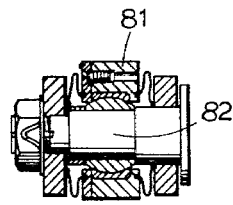
Figure 12:
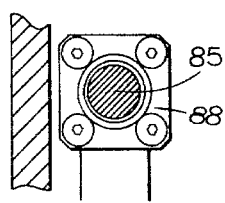
Figure 8:
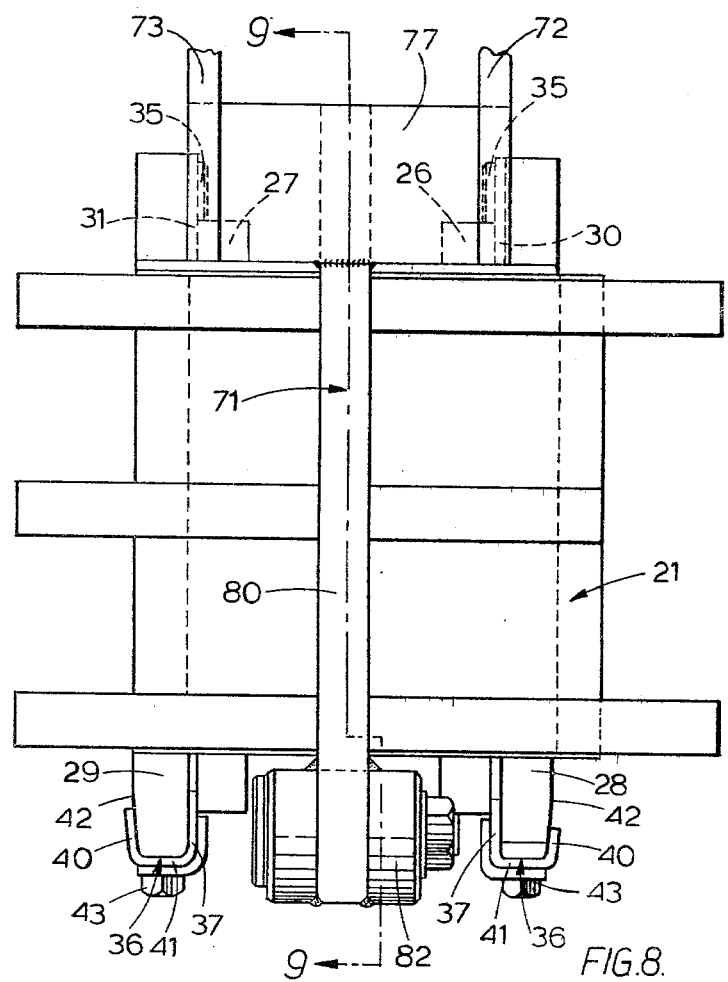
Figure 9:
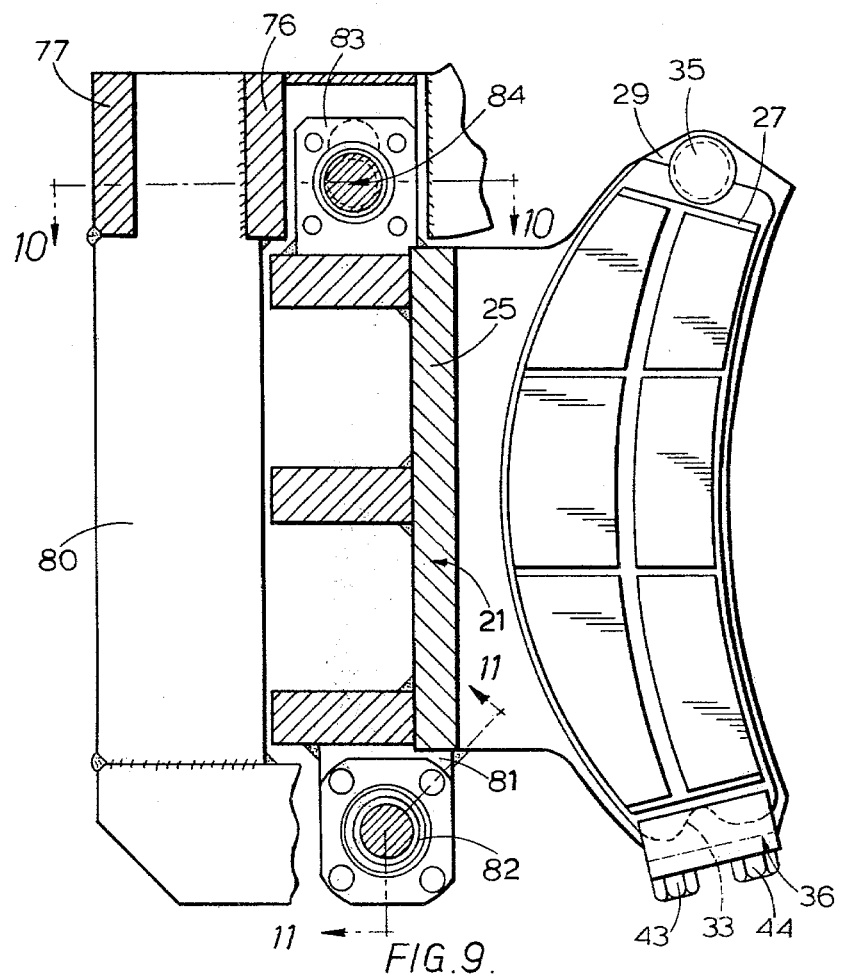

Two embodiments of our invention are illustrated in the accompanying drawings in which:

FIG. 1 is a plan of a disc brake for a rail vehicle;
FIG. 2 is a side elevation of the same;
FIG. 3 is a side elevation of a second disc brake for a rail vehicle;
FIG. 4 is a plan containing the stationary part;
FIG. 5 is an elevation normal to the view of FIG. 4;
FIG. 6 is a view of the caliper including a section through the actuating mechanism;
FIG. 7 is an end view of the caliper;
FIG. 8 is a plan of the caliper including its connection to the arm;
FIG. 9 is a section on the line 9—9 of FIG. 8;
FIG. 10 is a section on the line 10—10 of FIG. 9;
FIG. 11 is a section on the line 11—11 of FIG. 9; and
FIG. 12 is a part section on the line 12—12 of FIG. 10.

The disc brake illustrated in FIGS. 1 and 2 of the accompanying drawing comprises a rigid caliper 1 in the form of a closed yoke comprising opposed limbs 2 and 3, which are located on opposite sides of a disc 4 rotatable with an axle, and circumferentially spaced bridge pieces 5 and 6 which extend over the edge of the disc 4 and interconnect the limbs 2 and 3 at their opposite ends.

Opposed friction pads 7 and 8 are located in the caliper 1. The friction pad 7 is guided between drag-taking surfaces 9 and 10 in the limb 3 and is applied directly to the disc 4 by an actuating mechanism 11 mounted on, and disposed within, that limb 3. The other friction pad 8, which is carried by the opposite limb 2 of the caliper 1, is applied to the opposite face of the disc by the reaction on the caliper 1 of the actuating mechanism 11 which moves the caliper 1 bodily in a generally axial direction with respect to the disc 4.

The caliper 1 is carried from a stationary part 12 adjacent to, and aligned generally with, the plane of the disc 4 by means of a drag-transmitting arm 13. The arm 13 comprises a one-piece member of a curved outline which corresponds generally to the radius of the disc 4 and the arm 13 is superimposed upon, and lies in a plane parallel to or containing, the plane of the disc 4. The arm 13 is connected at one end to the stationary part 12 by means of a single pivot pin 14 of which the axis is normal to the plane of the caliper 1 and lies in or parallel to the plane of the disc 4. The arm 13 extends over the caliper 1 in a circumferential direction and, at its free end, is coupled to the bridge piece 6 by means of a spherical joint 15.

In operation the arm 13 moves angularly about the pivot pin 14 to enable the caliper 1 to move in a generally axial direction when the brake is applied. At the same time the caliper 1 can pivot about the joint 15. This enables the pads 7, 8 to be maintained in a parallel relationship with respect to the disc 4 when the brake is applied, in an attempt to maintain substantially even and parallel wear of the pads 7, 8.

In addition, the arm 13 is connected to the caliper 1 by means of a restraint connection 16. As illustrated the arm 13 is provided at the end adjacent to the stationary part 12 with a parallel-sided notch 17 which is chordal with respect to the disc 4 and into which the bridge piece 5 extends with axially spaced lugs 18 at the circumferentially outermost end of the bridge piece 5 straddling the base of the notch 17. Clearances 19 are provided between the sides of the notch 17 and the bridge piece 5, and clearances 20 are provided between the lugs 18 and the arm 13. The clearances 19 and 20 allow for small movements of the caliper 1 relative to the arm 13 in longitudinal and/or transverse directions. Such movements may be caused by angular movement of the disc 4 in response to differential vertical movement of the wheels on that axle and will cause the caliper 1 to "cock" over with respect to the disc.

Return springs 13a act between the arm 13 and the caliper 1 to restore the caliper 1 to its correct orientation when the disc 4 returns to its normal neutral position.

In the brake illustrated in FIGS. 3 to 12 a rigid caliper 21 of open-ended channel-shaped outline straddles the peripheral edge of a disc 22 which is rotatable with an axle of a rail vehicle. The caliper 21 comprises opposed limbs 23 and 24 which are interconnected by a single rigid bridge piece 25.

Friction pads 26 and 27 for engagement with opposite faces of the disc 22 are detachably mounted in the caliper 21, and each pad is carried by a rigid metal shoe 28, 29. Specifically each pad 26, 27 is carried by a rigid backing plate 30, 31. Each backing plate 30, 31 is of greater area than its respective pad 26, 27 and projects beyond the pad, particularly at opposite ends in which are formed part-circular notches 32 and 33.

Each notch 32 receives the stem 34 of a headed stud 35 under which that end of the backing plate 30, 31 is received. Each stud 35 acts as an abutment for that end of the backing plate and serves to prevent that end from moving axially away from the respective shoe 28, 29.

The opposite end of each backing plate 30, 31 is retained on its shoe 28, 29 by means of a detachable keeper 36. As illustrated the keeper 36 comprises a member of generally U-outline which embraces that end of the shoe 28, 29 and the respective backing plate 30, 31. The member 36 comprises a first limb 37 of which the inner face is of stepped outline to define an abutment face 38 which is normal to the shoe 28, 29 and a lip 39 which is parallel to but spaced from the shoe 1 by a distance slightly less than the thickness of the backing plate 30, 31. A second limb 40 is connected to the first limb 37 by a bridge piece 41 and is inclined with respect to the first limb 37. The keeper 36 has a degree of resilience so that, after fitting it over the end of the shoe 28, 29 and the backing plate 30, 31 with the limb 40 engaging with a corresponding inclined face 42 on the shoe 28, screwing two bolts 43, 44 through the bridge piece 41 and into tapped holes in the end of the shoe 28, 29 provides a wedge action to urge the lip 39 against the bakcing plate 30, 31 in response to movement of the keeper 36 towards the shoe 28, 29 until the abutment face 38 has engaged with the end of the backing plate 30, 31 to urge its opposite end into engagement with the stud 34.

The pads 26, 27 are therefore firmly mounted on the shoe 28, 29, but can be readily removed after first removing the keepers 36.

Since the backing plates 30, 31 are thinner than the depth of the abutment faces 38, the backing plates 30, 31 are clamped, at that end, against the shoes 28, 29 by the resilience of the keepers 36.

In a modification the studs 34 may be replaced by keepers similar to the keepers 36.

The pad 26 is guided for movement in an axial direction with respect to the disc on circumferentially spaced pins 45, 46 which are secured to the shoe 28 at their inner ends and are guided for sliding movement in circumferentially spaced opposed notches 47, 48 in the ends of the limb 23. Clearances are provided between the pins 45, 46 and the bases of the notches 47 and 48 so that, when the brake is applied, the drag on the pad 26 is transmitted to the limb 23 through the pin at the end of the caliper 21 with which any given point on the surface of the disc first comes into alignment for that given direction of disc rotation.

The pad 27 is rigidly fixed to the limb 24 through the shoe 29 so that, when the pad 27 is applied to the disc 22 directly by operation of an actuating mechanism 49 mounted on, and incorporated in, the limb 24, the pad 27 is simultaneously applied to the opposite face of the disc 22 by movement of the caliper 21 with respect to the disc 22 in a generally axial direction in response to the reaction of the actuating mechanism 49 on the caliper 21.

The actuator mechanism incorporates a housing 50 which is secured to the limb 23, and a thrust member 51 projecting from the housing 50 forms part of a screw-threaded assembly 52 which can be moved axially to apply the brake and of which the effective length can be increased substantially to compensate for wear of the material of the pad 26. The thrust member 51 has an enlarged head 53 at its free end and the head 53 is received in a recess 54 in the shoe 28 being retained in the recess 54 by a clamp member 55 which is housed in a recess 56 in the opposite face of the shoe 28 and is clamped against the head 53 by means of a bolt 57.

The housing 50 has an axial extension 58 which projects through an opening 59 in the limb 23 and terminates in close proximity to the position assumed by the head 53 when the shoe 28 is retracted with the pad 26 in a new unworn condition. At its free end the extension 58 has a bearing surface 59 in which the thrust member 51 is slidably guided, with a clearance 60 provided between the thrust member 51 and the remainder of the extension 58.

The bearing surface 59 takes any side loading to which the thrust member 51 may be subjected as the shoe 28 moves between the drag-taking abutments in the limb 23 as the direction of disc rotation is reversed when the brake is applied, thereby protecting the screw threads and the remainder of the actuator mechanism 49.

Normally the thrust member 51 is moved axially to apply the pad 26 to the disc 22 and it is automatically advanced bodily towards the disc to compensate for wear of the pad 26. However, when a worn pad is to be removed and replaced, the thrust member 51 is rotated to restore the shoe 28 to the initial position it assumed when the pad was new and unworn.

A sealing boot 61 is provided to prevent the ingress of dirt into the screw threaded assembly between the thrust member 51 and the limb 23.

As illustrated the boot 61 comprises first and second axially spaced annular end portions 62 and 63 which are interconnected by a flexible membrane 64 of elastomeric material and corrugated outline. A circular rigid carrier 65 located in an annular clearance between the head 53 and the recess 54 is a tight fit in the recess 54. The outer end of the carrier 65 has an inwardly directed radial flange 66 which abuts against a shoulder 67 on the head 53, and the inner end of the carrier 65 is deformed outwardly into a lip 68 behind which the portion 62 is received and upon which it is fixed by means of an annular locking member 69 which encircles the lip 68.

Conveniently the portion 62 is clamped by the lip 68 against the brake shoe 28.

Relative axial movement between the shoe 28 and the limb 23 when the brake is applied is accommodated by the flexible membrane 64. When the thrust member 51 is rotated to wind back the head 53 and the shoe 28 when the pad 26 is to be replaced, the frictional engagement of the carrier 65 in the recess 54 is greater than that between the flange 66 and the shoulder 67. Thus the carrier 65 and, in consequence, the boot 61 as a whole is prevented from rotating with the head 53.

As in the previous embodiment of FIGS. 1 and 2, the caliper 21 is carried from a stationary part 70 adjacent to the edge of the disc 22 by means of drag-transmitting arm 71. However, since it is desired to position the arm 71 as close as possible to the edge of the disc 22, and closer than the arm of FIGS. 1 and 2, the arm 71 is of fabricated construction. The arm 71 comprises axially spaced superimposed plates 72 and 73 of generally L outline which overlap the disc 22 and which are held in a spaced relationship by four spaced parallel spacing webs 74, 75, 76 and 77. The spacing webs 74 and 75 are located adjacent to and normal to the stationary part 70, and a single pivot pin 78 which lies in and is parallel to the plane of the disc 22 is rotatably received at opposite ends in the webs 74 and 75. The pin 78 is mounted in spaced lugs 79 on the stationary part 70, which lugs 79 lie inwardly of the webs 74 and 75.

The webs 76, 77 provide a mounting for a single elongate member 80 which extends over the caliper 21 in a circumferential direction and at its free end is coupled to a chordal extension 81 on the bridge piece 25 of the caliper 21 by means of a spherical joint 82.

In addition a chordal extension 83 at the opposite end of the bridge piece is received between the plates 72 and 73 to which it is connected by means of a restraint connection 84. As illustrated the restraint connection 84 comprises a transverse pin 85 which is received at opposite ends in plates 86 and 87 which, in turn, are secured to the inner faces of the plates 72 and 73. A central portion of the pin 85 housed within a sealed housing 88 is slidably received within a sleeve 89 of low friction material. A metal spring ring 90, for example a circlip, is located between the sleeve 89 and an opening 91 in the extension 83 through which the pin 85 projects and which is of convex outline to enable the extension 83 to rock with respect to the pin 85.

As in the embodiment of FIGS. 1 and 2 described above, in operation the arm 71 moves angularly above the pivot pin 78, and the caliper 21 can pivot about the joint 82 to enable the pads 26 and 27 to be maintained in a parallel relationship with respect to the disc 22. The sleeve 89 restrains transverse movement of the arm 71, and the spring ring 90 provides a resilient bias to restore the caliper 21 to its correct orientation and attitude when the disc 22 returns to a normal neutral position, following angular movement in response to differential vertical movement of the wheels on the axle.

What is claimed is:

1. A disc brake for a railway vehicle comprising a rotatable disc, a stationary drag-taking member adjacent to said disc, a rigid caliper straddling the peripheral edge of said disc and including opposed limbs located on opposite sides of said disc, friction pads for engagement with opposite faces of said disc located in said caliper, actuating means associated with one of said limbs for applying one of said friction pads directly to an adjacent one of said faces of said disc, the other of said friction pads being applied to the other one of said faces of said disc by the reaction on said caliper of said actuating means which causes said caliper to move with respect to said disc, a drag-transmitting arm carrying said caliper from said drag-taking member, a pivotal connection for connecting one end of said arm to said drag-taking member for pivotal movement about an axis normal to the axis of said disc, a spherical joint for coupling said caliper to said arm, and a restraint connection between said arm and said caliper for permitting small movements of said caliper relative to said arm in axial and radially transverse directions, for restraining larger subsequent movements of said caliper in said directions, and for restoring said caliper to a neutral position when said brake is not applied.

2. A disc brake as claimed in claim 1, wherein said arm extends from said pivotal connection over said caliper itself in a circumferential direction with said spherical joint providing a connection between the opposite free end thereof and the end of said caliper which is remote from said stationary member, and said restraint connection is provided between said arm at an intermediate point in the length of said arm and the end of said caliper which is adjacent to said stationary member.

3. A disc brake as claimed in claim 1, wherein said restraint connection comprises a pair of lugs which project from the said end of said caliper to straddle the end of a slot in said arm and into which the said end of said caliper extends, clearances being provided between said lugs and said arm and between said caliper and the radially innermost and outermost sides of said slot, and springs acting between said arm and said caliper to restrain relative tilting movement therebetween.

4. A disc brake as claimed in claim 1, wherein said restraint connection comprises a spindle, a spring ring in said caliper, a bushing retained in said spring ring and in which said spindle is received with opposite ends of said spindle projecting from said bushing, and a bifurcated portion of said arm in which said opposite ends of said spindle are received, said bushing being of low friction material to restrain movement along the axis of said spindle, and said spring ring acting to restrain relative tilting movement between said caliper and said arm.

5. A disc brake as claimed in claim 1, wherein circumferentially spaced axially extending pins are provided in the said one of said limbs and the said one of said fricton pads is slidably guided for movement in an axial direction on said pins which transmit drag to said caliper when the brake is applied.

6. A disc brake as claimed in claim 5, wherein the said one of said pads is carried by said pins, and said pins are slidably received in openings in the said one of said limbs of said caliper.

7. A disc brake as claimed in claim 6, wherein said openings comprise oppositely directed notches in circumferentially outermost end edges of said one limb of said caliper with clearances provided between said pins and bases of said notches.

8. A disc brake as claimed in claim 1, wherein said actuating means comprises a housing mounted on the said one of said limbs, and said actuating means incorporates a thrust member which is axially movable in said housing to apply the said one pad to said disc, and said housing is provided with an extension which extends axially towards said disc, said extension defining a bearing in which said thrust member is guided for axial sliding movement.

9. A disc brake as claimed in claim 8, wherein a boot provides a seal between said thrust member and said caliper, said boot comprising first and second end portions, and a flexible impermeable web interconnecting said end portions and accomodating relative axial movement between said end portions, a rigid imperforate carrier extending axially away from said web and to which second portion is secured, and a radial flange being formed at a free end of said carrier which is remote from said second portion, and wherein an abutment is provided on said caliper with which said first end portion engages, and an abutment is provided on said thrust member with which said flange engages, said abutments being relatively rotatable, and said carrier engaging with the said one of said pads and being fixed against rotation with respect to said thrust member to prevent said carrier from rotating with said thrust member with respect to which said flange can rotate.

10. A disc brake as claimed in claim 9, wherein said thrust member is provided with a shoulder, said flange is directed inwardly, and the said one of said pads has an opening in which said thrust member is rotatably received with said flange engaging with said shoulder and said carrier being a close fit in, and engaging over, a first substantial area, of said opening, said shoulder and said flange being of an area which is small in comparison with that of said first area so that the force of frictional engagement which keys said carrier to the said one of said pads is greater than the force of frictional engagment which keys said carrier to said thrust member.

11. A disc brake as claimed in claim 1, wherein one of each friction pad is carried by a rigid backing plate, and a shoe is provided by means of which said pad can be applied to said disc, said backing plate being detachably mounted on said shoe, and said shoe having an abutment, a keeper being provided for urging said backing plate against said abutment on said shoe, said keeper comprising first and second spaced limbs which embrace an end of said shoe and a corresponding end of said backing plate, said first limb being of stepped outline to define an abutment face which is normal to said shoe for engagement with an adjacent end of said backing plate to clamp the opposite end against said abutment for that said end, and a lip normal to said abutment face which overlies said backing plate to prevent movement of said backing plate away from said shoe at that said end, and said second limb being inclined away from the said first limb and having a wedge engagement with an inclined face on the side of said shoe remote from said backing plate, and coupling means are provided for detachably securing said keeper to said shoe to clamp said backing plate between said abutment and said abutment face.

12. A disc brake as claimed in claim 11, wherein said keeper is provided with a degree of resilience which enables said second limb to deflect resiliently as dictated by said inclined face in order to compensate for tolerance variations and ensure that opposite ends of said backing plate are clamped firmly between said abutment and said abutment face.

13. A disc brake as claimed in claim 11, wherein the depth of said abutment face is slightly less than the thickness of said backing plate to ensure that said backing plate is resiliently urged into engagement with said shoe with a predetermined force.

* * * * *